United States Patent [19]

Marquart

[11] Patent Number: 4,915,193
[45] Date of Patent: Apr. 10, 1990

[54] AIR/OIL LEVEL CONTROL FOR TRANSMISSION LUBRICATION

[75] Inventor: Gordon L. Marquart, Jesup, Iowa
[73] Assignee: Deere & Company, Moline, Ill.
[21] Appl. No.: 374,885
[22] Filed: Jul. 3, 1989
[51] Int. Cl.$^4$ .............................................. F01M 9/10
[52] U.S. Cl. ..................................... 184/6.12; 74/467
[58] Field of Search ........................... 74/467; 184/6.12
[56] References Cited

U.S. PATENT DOCUMENTS 4,529,061  7/1985  Glasrud et al. .................. 184/103 R Primary Examiner—Carroll B. Dority

[57] ABSTRACT

The oil level is controlled between the main gear shift chamber of a transmission and the final reduction gearing/differential chamber by pumping air from the differential chamber into the main gear chamber. The increased air pressure then forces oil back into the differential chamber. The air pump preferably is a simple piston pump driven by a cam on one of the drive shafts on the main transmission chamber. An oil film is provided in the passage connecting the main transmission chamber to allow flow of oil between those chambers, while preventing the flow of air.

14 Claims, 1 Drawing Sheet

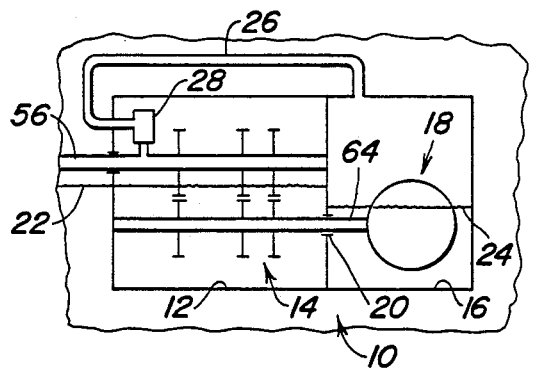
FIG. 1
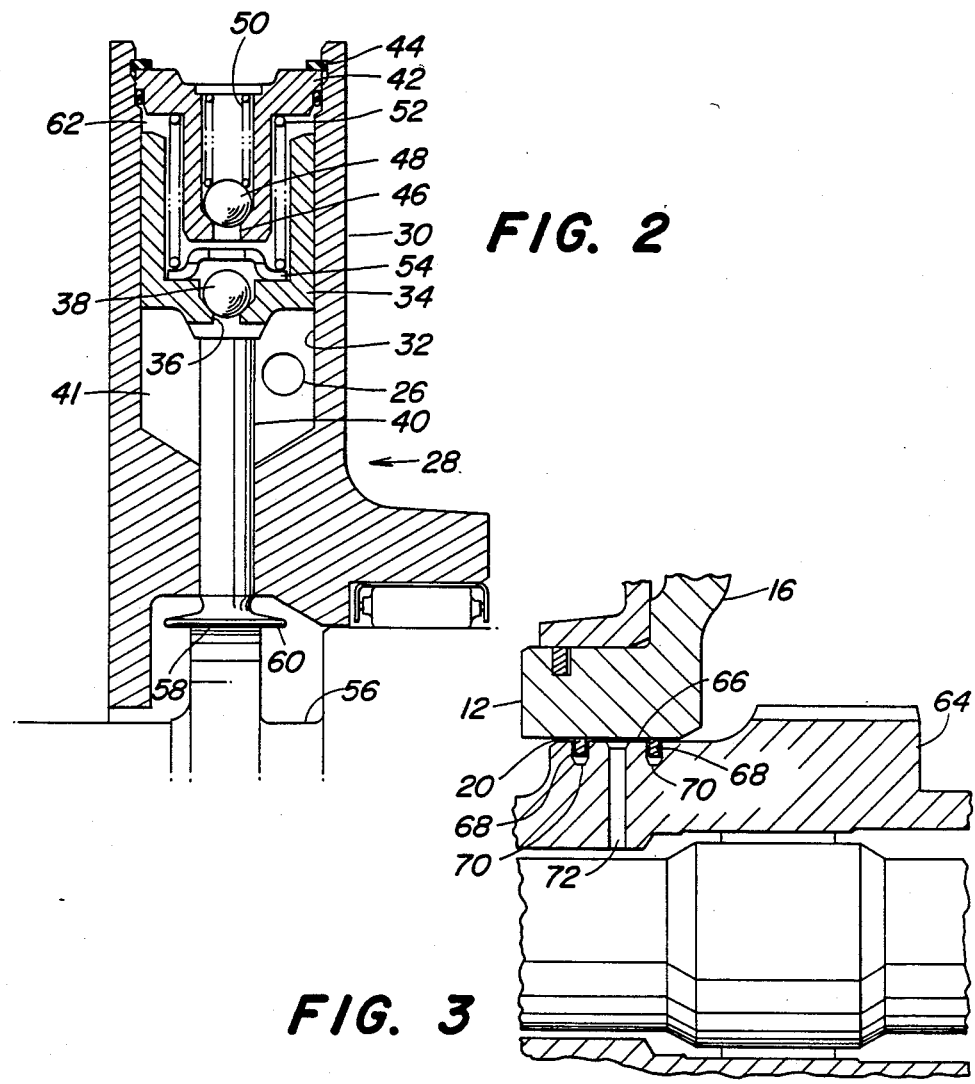
FIG. 2
FIG. 3

AIR/OIL LEVEL CONTROL FOR TRANSMISSION LUBRICATION

TECHNICAL FIELD

The present invention relates to lubrication systems for a transmission, and in particular to mechanisms for controlling the oil level in different parts of the transmission.

BACKGROUND OF THE INVENTION

Transmission housings frequently are divided into sections, with different components of the transmission being provided in different sections. For example, it is fairly common to have a partition separating the final reduction gear/differential from the main gear shift portion of the transmission.

In this type of housing, one problem which can arise is that oil can flow undesirably from one chamber into the other, for example, while the vehicle is on a slope. This can create unacceptably high oil levels in one part of the housing and unacceptably low oil levels in the gear shift case.

Various mechanisms for dealing with such situations have been proposed. One technique for dealing with this problem is to completely separate the two housings. Another is to provide a pump to pump oil from the chamber in which it accumulates to the chamber where it is low. Such a technique is shown, e.g., in U.S. Pat. No. 4,529,061 (Glasrud et al.). This, however, has the disadvantage that a fairly large diameter connection is required for oil flow and the oil tends to accumulate contaminants, which can clog the line.

Accordingly, it is the purpose of the present invention to provide a system for balancing oil levels which does not require an oil pump to move the oil from one chamber to the other.

SUMMARY OF THE INVENTION

According to the present invention, the passage connecting the two chambers allows oil flow therebetween (preferably in small quantities), but does not allow air flow therebetween. At least the chamber in which oil tends to accumulate is sealed against atmosphere, and air is pumped into that chamber through the other chamber, thereby forcing oil back into the other chambers with the oil passage.

While air could be pumped from the atmosphere, pumping it from the second chamber has the advantage of minimizing moisture and contaminants in the transmission environment.

The pump itself preferably is a simple piston pump mounted within the chamber in which oil tends to accumulate and driven by a cam on a drive shaft in that chamber.

BRIEF DESCRIPTION OF THE DRAWINGS

FIG. 1 is a general schematic view of a transmission including an air/oil leveling system according to the present invention.

FIG. 2 is a more detailed view of the air pump portion of the embodiment of FIG. 1.

FIG. 3 is a more detailed view of the oil passage portion of the embodiment of FIG. 1.

DETAILED DESCRIPTION OF THE PREFERRED EMBODIMENT

A transmission 10 has a first transmission housing chamber 12 containing the main gear shift transmission, illustrated schematically at 14, and a second transmission housing chamber 16 containing the final reduction gear and differential, illustrated schematically at 18. Oil, but not air, can flow through an oil passage 20 connecting the two housing chambers 12, 16. Centrifugal forces generated by rotation of the differential gearing 18 tends to force oil from the second housing chamber 16 towards the first housing chamber 12, with the result that the oil level 22 in the first housing chamber 12 tends towards a higher level than the oil level 24 in the second housing chamber 16.

An air passage 26 connects an upper, normally air-filled portion of the second transmission housing chamber 16 with an air pump 28 positioned in the upper, normally air-filled portion of the first chamber 12. The exact position of the air passage 26 can vary as required for the installation, and is merely illustrated schematically here.

Turning to FIG. 2, the air pump 28 is shown in greater detail. While any form of air pump could be used, preferably a simple piston operated pump driven by cam action off a drive shaft in the transmission is employed. The air pump illustrated has a pump housing 30 with a central piston bore 32 formed therein. A piston 34 is slidably mounted in the piston bore. The piston 34 has an opening 36 closable by a check ball 38, and is fixed to slide with a piston rod 40. The piston 34, rod 40 and bore 32 define therebetween a rod end chamber 41 to which air passage 26 connects. An end cap 42 is held in the piston bore 32 by a snap ring 44 on the side of piston 34 opposite from the rod end chamber 41. Screw threads or any other suitable means of holding the end cap 42 can be used in place of the snap ring. The end cap 42 has an opening 46 formed therein which is closable by a check ball 48. A spring 50 biases the end cap check ball 48 into a position closing off the end opening 46. Another spring 52 holds a check ball stop 54 in position to prevent the piston check ball 38 from moving too far away from the piston opening 36, while simultaneously biasing the piston 34 towards the rod end of the piston bore 32. Finally, a drive shaft 56 of the transmission is provided with a cam surface 58, along which the end 60 of the rod 40 opposite from the piston 34 rides.

In operation, rotation of the drive shaft 56 (which rotates cam surface 58), in conjunction with spring 52, will cause the piston 34 to move up and down in the piston bore 32. As the piston moves upward, air will be drawn through passage 26 from the second transmission housing chamber 16 into the rod end pump chamber 41. The pressure differential and centrifugal force on the check ball 38 created by this motion will draw check ball 38 into a position closing the piston opening 36. Upon movement of the piston 34 downward, the pressure differential between the rod end chamber 41 and the cylinder end chamber 62 will open the check valve 36, 38 and draw air into the cylinder end chamber 62 of the pump. While this is occurring, spring 50 and the pressure in chamber 12 will hold the check valve 46, 48 closed. When the cycle is then repeated, the pressure of the air in cylinder end chamber 62 will exceed the check valve opening pressure, opening the check valve 46, 48. This will force air out into the first transmission housing chamber 12, pressurizing that chamber. For this to work properly, of course, the first transmission housing chamber should be sealed against atmosphere.

Turning to FIG. 3, one structure for an oil passage which will allow passage for oil, but not air, is illustrated. The oil passage 20 is formed by the space between a drive shaft 64 extending from the first chamber 12 into the second chamber 16 and the walls 66 of the opening through which the drive shaft 64 passes. Two sealing rings 68 are provided in slots 70 in the drive shaft, and oil is provided between the sealing rings 68 via an oil passage 72 to form an oil film between the sealing rings 68. This oil film will allow oil to flow between the chambers 12, 16 but prevent air from flowing between the two chambers.

While the invention has been described in conjunction with a specific embodiment, it is to understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A system for regulating oil level in a transmission, comprising:
   a. a transmission housing having first and second chambers formed therein, each chamber being partially filled with oil and partially filled with air, and at least the first chamber being substantially sealed from atmosphere;
   b. an oil passage interconnecting said first and second chambers at points thereof normally covered by the oil within the chambers;
   c. a seal in said oil passage allowing oil to flow between said chambers but substantially preventing the flow of air between said chambers;
   d. an air passage interconnecting said first and second chambers at points thereof normally exposed to the air within the chambers;
   e. an air pump for forcing air through said air passage from said second chamber to said first chamber, such that oil is forced through said oil passage from said first chamber to said second chamber.

2. The system of claim 1, wherein said air pump is positioned within said first chamber.

3. The system of claim 2, wherein said air pump is positioned in a portion of said first chamber remote from said oil passage.

4. The system of claim 3, wherein said transmission has a drive shaft in said first chamber and said air pump is driven by said drive shaft.

5. The system of claim 4, wherein said drive shaft is provided with an eccentric cam surface adjacent said air pump and said air pump comprises a cam follower for following said cam surface and being driven thereby.

6. The system of claim 5, wherein said air pump comprises:
   a. a cylinder;
   b. a piston slidable within said cylinder, said cylinder and said piston defining a cylinder chamber therebetween;
   c. a first check valve connected between said cylinder chamber and said air passage, and allowing flow from said air passage to said cylinder chamber, but not from said cylinder chamber to said air passage;
   d. a second check valve connected between said cylinder chamber and a portion of said second chamber outside of said cylinder which normally is exposed to the air in said first chamber, said second check valve allowing air to flow from said cylinder chamber into said first chamber, but not from said first chamber into said cylinder chamber;
   e. a rod connecting said piston to said cam follower such that said piston is moved back and forth in said cylinder by said cam surface of said drive shaft.

7. The system of claim 6, wherein said air pump further
   a. a first spring biasing said piston towards said cam surface; and
   b. a second spring biasing said second check valve to a closed position.

8. The system of claim 1, wherein said transmission has a drive shaft extending from said first chamber to said second chamber through said oil passage, and wherein said seal comprises an oil film between the walls of said passage and said drive shaft.

9. The system of claim 8, wherein the portion of the transmission in the first chamber comprises a gear-shift transmission and the portion of the transmission in the second chamber comprises a differential.

10. A lubrication system for a transmission having:
    a. a first housing chamber containing gear-shift transmission components, the first housing chamber being partially filled with oil and partially filled with air;
    b. a second housing chamber containing a differential, the second chamber being partially filled with oil, partially filled with air and substantially sealed from atmosphere; the lubrication system comprising:
    c. oil transfer means interconnecting said first and second housing chambers for allowing oil flow therebetween;
    d. air transfer means interconnecting said first and second housing chambers for allowing air to flow from said second housing chamber to said first housing chamber, but not from said first housing chamber to said second housing chamber; and
    e. pump means connected to said air transfer means for forcing air through said air transfer means from said second housing chamber to said first housing chamber, thereby forcing oil through said oil transfer means from said first housing chamber to said second housing chamber.

11. The lubrication system of claim 10, wherein said oil transfer means comprises a passage interconnecting said first and second housing chambers at points thereof normally covered by oil.

12. The lubrication system of claim 11, wherein the transmission has a drive shaft extending between said first and second housing chambers through said passage and said oil transfer means further comprises an oil film between the walls of said passage and said drive shaft.

13. The lubrication system of claim 10, wherein said air transfer means comprises a passage interconnecting said first and second housing chambers at points thereof normally exposed to air and a check valve positioned across said passage to allow flow of air from said second housing chamber to said first housing chamber, but not from said first housing chamber to said second housing chamber.

14. The lubrication system of claim 10, wherein the air pump is positioned within the first chamber.

* * * * *

UNITED STATES PATENT AND TRADEMARK OFFICE
CERTIFICATE OF CORRECTION

PATENT NO. : 4,915,193

DATED : 10 April 1990

INVENTOR(S) : Gordon LeRoy Marquart

It is certified that error appears in the above-identified patent and that said Letters Patent is hereby corrected as shown below:

In column 3, line 64, delete "second" and insert -- first --.

Signed and Sealed this

Twenty-ninth Day of October, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,915,193
DATED : 10 April 1990
INVENTOR(S) : Gordon Le Roy Marquart It is certified that error appears in the above-identified patent and that said Letters Patent is hereby corrected as shown below:

In Col. 4, line 9, after the last part of the word further ("ther"), insert -- comprises: --.

Signed and Sealed this

Twenty-first Day of January, 1992

Attest:

HARRY F. MANBECK, JR.

*Attesting Officer*    Commissioner of Patents and Trademarks